(12) United States Patent
Babin

(10) Patent No.: US 7,131,832 B2
(45) Date of Patent: Nov. 7, 2006

(54) TRANSFER SEAL FOR A REMOVABLE NOZZLE TIP OF AN INJECTION MOLDING APPARATUS

(75) Inventor: Denis Babin, Georgetown (CA)

(73) Assignee: Mold-Masters Limited, Georgetown (CA)

(*) Notice: Subject to any disclaimer, the term of this patent is extended or adjusted under 35 U.S.C. 154(b) by 296 days.

(21) Appl. No.: 10/686,624

(22) Filed: Oct. 17, 2003

(65) Prior Publication Data

US 2004/0224046 A1 Nov. 11, 2004

Related U.S. Application Data

(60) Provisional application No. 60/468,629, filed on May 8, 2003.

(51) Int. Cl.
B29C 45/20 (2006.01)

(52) U.S. Cl. .................. 425/549; 264/328.15

(58) Field of Classification Search ........ 425/549; 264/328.15
See application file for complete search history.

(56) References Cited

U.S. PATENT DOCUMENTS

| 4,434,053 A | 2/1984 | Osuna-Diaz |
| 4,746,635 A | 5/1988 | Inoue et al. |
| 4,875,848 A | 10/1989 | Gellert |
| 5,208,052 A | 5/1993 | Schmidt |
| 5,275,845 A | 1/1994 | Krings et al. |
| 5,299,928 A | 4/1994 | Gellert |
| 5,421,716 A | 6/1995 | Gellert |
| 5,569,475 A | 10/1996 | Adas et al. |
| 5,658,604 A | 8/1997 | Gellert et al. |
| 5,804,228 A | 9/1998 | Kofsman |
| 5,879,727 A | 3/1999 | Puri |
| 5,885,628 A | 3/1999 | Swenson et al. |
| 6,009,616 A | 1/2000 | Gellert |
| 6,164,954 A | 12/2000 | Mortazavi et al. |
| 6,227,461 B1 | 5/2001 | Schroeder et al. |
| 6,234,783 B1 | 5/2001 | Shibata et al. |
| 6,245,278 B1 | 6/2001 | Lausenhammer et al. |
| 6,302,680 B1 | 10/2001 | Gellert et al. |
| 6,315,549 B1 | 11/2001 | Jenko et al. |
| 6,318,990 B1 | 11/2001 | Gellert et al. |
| 6,331,106 B1 | 12/2001 | Helldin |
| 6,394,785 B1 | 5/2002 | Ciccone |
| 6,428,305 B1 | 8/2002 | Jenko |
| 6,530,770 B1 | 3/2003 | Sheffield et al. |

(Continued)

FOREIGN PATENT DOCUMENTS

DE 100 08 722 A1 8/2001

(Continued)

OTHER PUBLICATIONS

Web defination of AerMet 100 Alloy, Apr. 6, 2006,cartech.com/products/wr_products_strength_am100.html.*

(Continued)

Primary Examiner—Tim Heitbrink
(74) Attorney, Agent, or Firm—McDonnell Boehnen Hulbert & Berghoff LLP

(57) ABSTRACT

A two-piece transfer seal for coupling a nozzle tip to a nozzle of an injection molding apparatus includes a retaining member removably connected to a downstream end of the nozzle and a removably connected nozzle sealing member. The retaining member is comprised of a first material and at least the sealing face of the sealing member is comprised of a second material. In certain applications, the nozzle sealing member is a mold gate insert. In certain applications, the two-piece transfer seal does not retain the nozzle tip, which is metallurgically bonded to the nozzle.

30 Claims, 3 Drawing Sheets

U.S. PATENT DOCUMENTS

| | | |
|---|---|---|
| 6,533,571 B1 | 3/2003 | Filani |
| 6,609,902 B1 | 8/2003 | Blais et al. |
| 6,921,257 B1 * | 7/2005 | Olaru .................... 425/549 |
| 2002/0098262 A1 | 7/2002 | Babin |
| 2003/0082266 A1 | 5/2003 | Babin et al. |
| 2003/0086997 A1 | 5/2003 | Olaru |
| 2003/0211199 A1 | 11/2003 | Eigler et al. |

FOREIGN PATENT DOCUMENTS

| | | |
|---|---|---|
| EP | 0 329 990 A1 | 8/1989 |
| EP | 0 854 027 A1 | 7/1998 |
| FR | 2.051.891 | 4/1971 |
| JP | 5-177664 | 7/1993 |
| JP | 6-143358 | 5/1994 |
| JP | 11-254488 | 9/1999 |
| WO | WO 00/093111 | 2/2000 |
| WO | WO 01/98053 | 12/2001 |
| WO | WO 03/028973 | 4/2003 |
| WO | WO 03/028974 A1 | 4/2003 |

OTHER PUBLICATIONS

Web defination of Ampco material, Apr. 6, 2006, industry-eu.cz/svarovani/en/index.php, pp. 1-14.*

* cited by examiner

TRANSFER SEAL FOR A REMOVABLE NOZZLE TIP OF AN INJECTION MOLDING APPARATUS

This application is a non-provisional application Ser. No. 60/468,629 filed May 8, 2003.

FIELD OF THE INVENTION

The present invention relates generally to an injection molding apparatus and, in particular to a removable nozzle tip that is coupled to a nozzle by a transfer seal.

BACKGROUND OF THE INVENTION

Injection molding nozzle assemblies having a nozzle body and a separate nozzle tip are well known in the art. The nozzle tip may include a threaded portion to allow for direct coupling to threads on the nozzle body or, alternatively, a removable transfer seal may be provided to secure the tip to the nozzle body. The transfer seal typically includes a threaded portion for mating with threads on the nozzle body.

In addition to securing the nozzle tip to the nozzle body, the transfer seal functions to insulate the hot nozzle tip from the cold mold cavity plate. The nozzle tip is typically comprised of a highly thermally conductive material to facilitate heat transfer from heaters coupled to the nozzle to the melt flowing through the nozzle tip. The transfer seal is typically comprised of a low thermally conductive material, such as titanium, to insulate the nozzle tip from the cold mold cavity plate. The transfer seal further forms a seal with the cavity plate to prevent pressurized melt from escaping into the insulative air space that surrounds the nozzle.

A transfer seal is disclosed in U.S. Pat. No. 5,299,928 to Gellert. The one-piece transfer seal is comprised of a thermally insulative material and includes a portion that is located between the nozzle and the nozzle tip. This one-piece nozzle seal further includes a threaded portion to connect the seal to the nozzle.

As such, a need exists for a transfer seal that provides a good performance over a broader range of applications and that can be replaced in case of partial damage in a more efficient manner.

SUMMARY OF THE INVENTION

This invention teaches a novel injection nozzle in which a transfer seal that surrounds a nozzle tip is made of two members that are removably attached to the nozzle and to one another. Each member has a unique function such that each may be formed to accommodate different manufacturing tolerances and methods. For example, one member has a threaded portion to engage the nozzle and the other member acts as a seal, as an alignment surface and an insulator. The two members may be made of two different materials. Further, if the transfer seal is damaged during manufacturing or use, only the damaged member needs to be repaired or replaced. In one embodiment of the invention, one member of the transfer seal retains a nozzle tip. In another embodiment, the nozzle tip is metallurgically bonded to a nozzle body, and thus it is not retained by the transfer seal. Still, this second type of a tip can be removed by local heating.

According to an embodiment of the present invention there is provided a transfer seal for coupling a nozzle tip to a nozzle of an injection molding apparatus, the transfer seal including:

a retaining member removably connected to a downstream end of the nozzle, the retaining member having an inwardly directed retaining flange provided at a downstream end of the retaining member;

a sealing member having a mating flange sandwiched between the inwardly directed retaining flange and a step provided in the nozzle tip, the sealing member having a sealing face for abutting a surrounding wall of a mold cavity plate opening; and wherein the retaining member is comprised of a first material and at least the sealing face of the sealing member is comprised of a second material.

According to another embodiment of the present invention there is provided a transfer seal for coupling a nozzle tip to a nozzle of an injection molding apparatus, the transfer seal comprising:

a retaining member removably connected to a downstream end of the nozzle, the retaining member having a shoulder for abutting a first step provided in the nozzle tip and an inwardly directed retaining flange provided at a downstream end of the retaining member;

a sealing member having a mating flange sandwiched between the inwardly directed retaining flange and a second step provided in the nozzle tip, the sealing member having a sealing face for abutting a surrounding wall of a mold cavity plate opening; and wherein the retaining member is comprised of a first material and at least the sealing face of the sealing member is comprised of a second material.

According to an embodiment of the present invention there is provided a transfer seal for coupling a nozzle tip to a nozzle of an injection molding apparatus, the transfer seal including:

a retaining member removably connected to a downstream end of the nozzle, the retaining member having a shoulder for abutting a first step provided in the nozzle tip and an inwardly directed retaining flange provided at a downstream end of the retaining member;

a sealing member having a mating flange sandwiched between the inwardly directed retaining flange and a second step provided in the nozzle tip, the sealing member having a sealing face for abutting a surrounding wall of a mold cavity plate opening; and wherein the retaining member is comprised of a first material and at least the sealing face of the sealing member is comprised of a second material.

According to another embodiment of the present invention there is provided an injection molding apparatus including:

a manifold having a manifold channel for delivering a melt stream of moldable material to a nozzle channel of a nozzle, the nozzle being received in a mold cavity plate opening;

a nozzle tip nested in a downstream end of the nozzle, the nozzle tip having a melt channel in communication with the nozzle channel for receiving the melt stream from the nozzle channel;

a mold cavity for receiving the melt stream from the melt channel of the nozzle tip through a mold gate;

a transfer seal having a retaining member and a sealing member for coupling the nozzle tip to the nozzle, the retaining member being removably connected to the downstream end of the nozzle and having an inwardly directed retaining flange, the sealing member having an outwardly directed mating flange that is sandwiched between the inwardly directed retaining flange and a step provided in the nozzle tip, a sealing surface of the sealing member abutting a surrounding wall of the mold cavity plate opening; and wherein the retaining member is comprised of a first material and at least the sealing face of the sealing member is comprised of a second material.

According to yet another embodiment of the present invention there is provided an injection molding apparatus including:

a manifold having a manifold channel for delivering a melt stream of moldable material to a nozzle channel of a nozzle, the nozzle having a threaded downstream end;

a nozzle tip located adjacent the threaded downstream end of the nozzle, the nozzle tip having a melt channel in communication with the nozzle channel for receiving the melt stream from the nozzle channel;

a mold cavity for receiving the melt stream from the melt channel of the nozzle tip through a mold gate;

a transfer seal for securing the nozzle tip to the nozzle, the transfer seal having a retaining member for mating with the threaded downstream end of the nozzle, a shoulder for abutting at least a portion of an outer wall of the nozzle tip and a sealing member having a sealing face for abutting a cavity plate surrounding the mold gate;

wherein an outwardly directed flange of the sealing member is sandwiched between an inwardly directed flange of the retaining member and a step provided in an outer wall of the nozzle tip.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
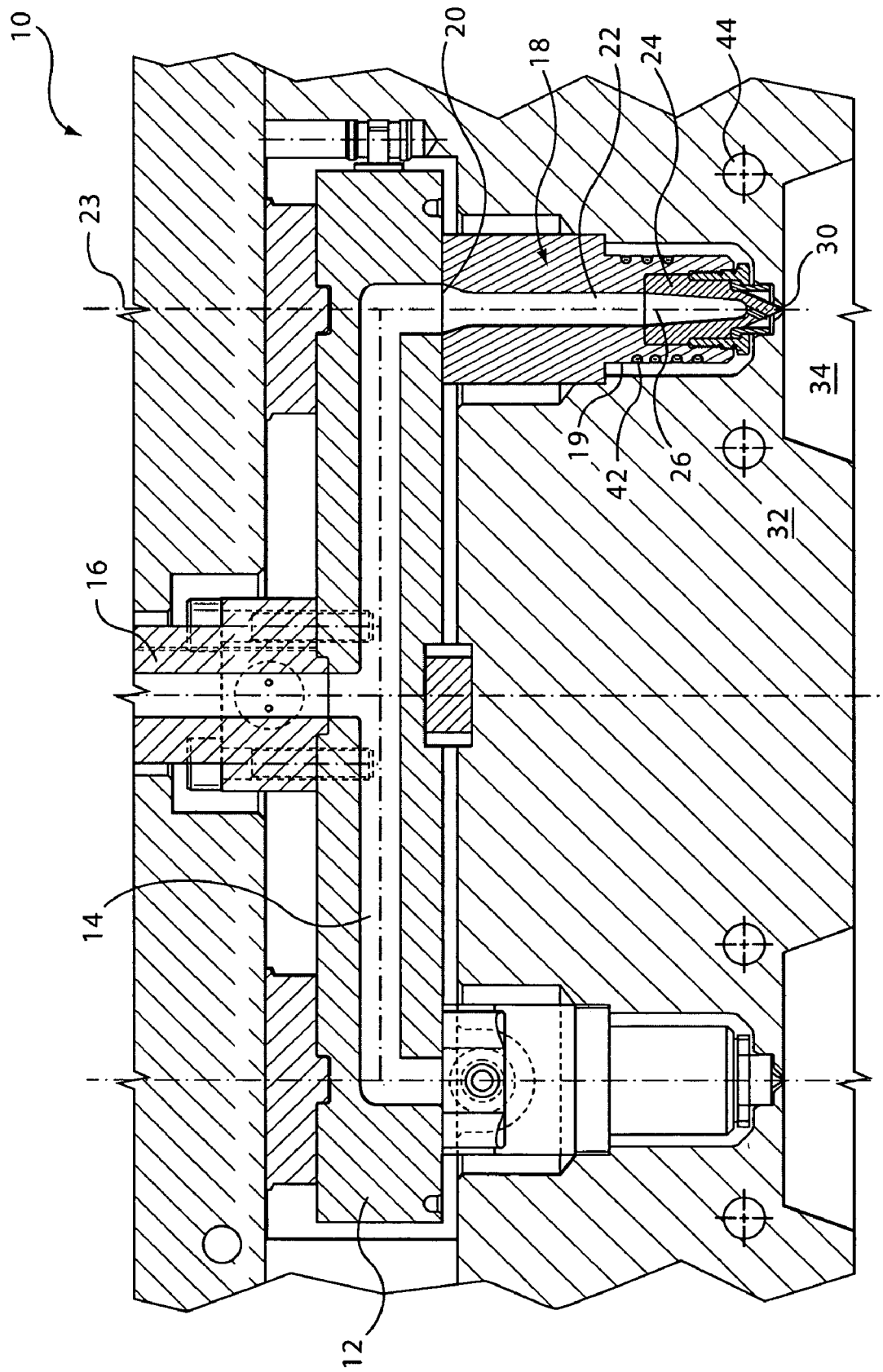
FIG. 1 is a side sectional view of an injection molding apparatus according to an embodiment of the present invention.

Referring now to FIG. 1, an injection molding apparatus is generally shown at 10. The injection molding apparatus 10 comprises a manifold 12 having a manifold melt channel 14 for receiving a melt stream of moldable material under pressure from a manifold bushing 16. The manifold bushing 16 is in communication with a machine nozzle (not shown).

Nozzles 18 are coupled to respective outlets 20 of the manifold 12. A nozzle channel 22, which is generally aligned with axis 23, extends through each nozzle 18 to receive the melt stream of moldable material from the manifold 12. A nozzle tip 24 is coupled to a downstream end of each nozzle 18. Each nozzle tip 24 includes a melt channel 26 that is aligned with a respective nozzle channel 22 for receiving the melt stream therefrom. The nozzle tip 24 is comprised of a highly thermally conductive material such as Beryllium-Copper, for example. The nozzle tip 24 may alternatively be made of other materials including, Copper Alloy, Beryllium-free Copper, TZM, Tungsten Carbide, Tool Steel, Hardened Steel, H13, AerMet™ 100 or 310 Alloys (e.g., an iron-cobalt-nickel alloy that has been strengthened by carbon, chrome, and molybdenum, Ampco™ (e.g., alloys based on copper, bronze, aluminum, tin, brass, and also containing beryllium) and Stainless Steel.

Mold gates 30 are provided in a mold cavity plate 32. The mold gates 30 are openable to allow delivery of melt to respective mold cavities 34 in the injection molding apparatus 10. The mold gates 30 are thermal gated, however, may alternatively be valve gated. Both thermal gated and valve gated nozzles are well known in the art and therefore will not be described herein.

Manifold heaters (not shown) and nozzle heaters 42 heat the manifold 12 and nozzles 18 respectively in order to maintain the melt stream at a desired temperature. Cooling channels 44 are provided adjacent the mold gates 30 and the mold cavities 34 in order to facilitate cooling of the melt in the mold cavities 34.

Figure 2:
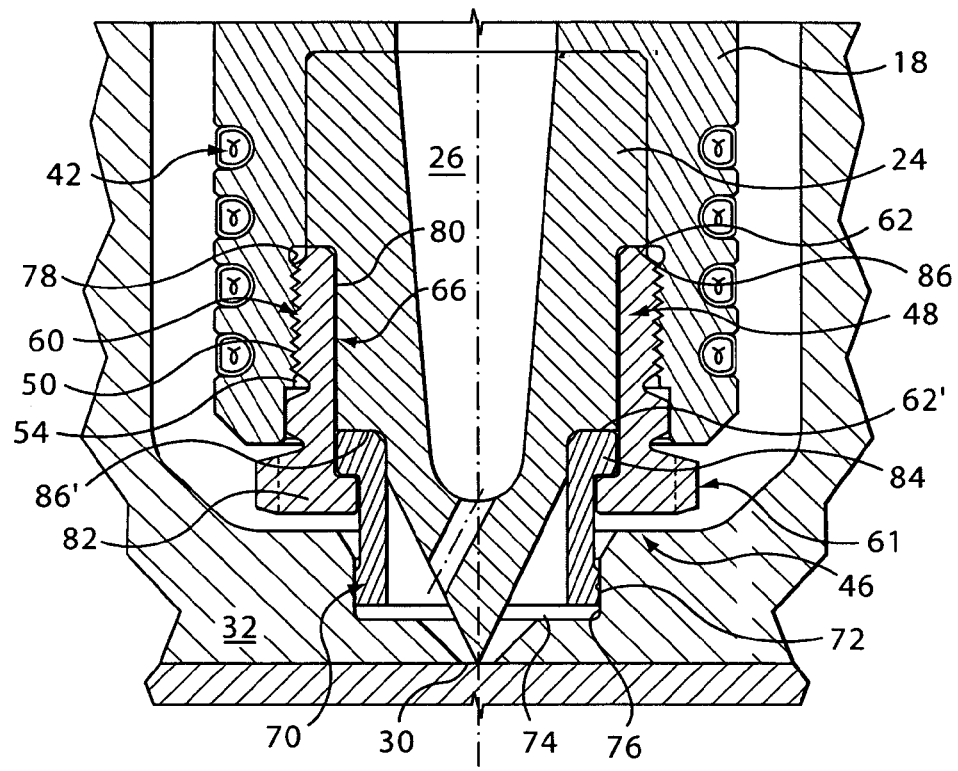
FIG. 2 is an enlarged view of a portion of FIG. 1.

As shown in FIG. 2, a transfer seal 46 is comprised of a retaining member 48 and a separate sealing member 70. The retaining member 48 includes an inner surface 80 for abutting an outer wall 66 of a nozzle tip 24 and an outer surface 60 having threads 50 formed therein. The threads 50 mesh with threads 54 that are formed on an inner surface 78 of the nozzle 18.

The retaining member 48 is comprised of a thermally conductive material in order to facilitate heat flow from the nozzle 18 to the nozzle tip 24. This allows heat provided by the nozzle heater 42 to be transferred efficiently to the nozzle tip 24. The retaining member 48 does not directly contact the cold mold plate 32, therefore, it is not necessary for the retaining member 48 to be an insulator. The retaining member 48 may be comprised of a conductive material such as Beryllium-Copper, Copper Alloy, Beryllium-free Copper, TZM, Tungsten Carbide, Tool Steel, Hardened Steel, H13, AerMet™ 100 or 310 Alloys, Ampco™, Stainless Steel or any other suitable thermally conductive material.

In applications having processing conditions in which thread galling is likely to occur, a lubricant is applied to the threads to reduce the amount of friction therebetween. A lubricant such as any Loctite® anti-seize compound manufactured by Loctite America or any other suitable lubricant may be used. Another method for reducing the occurrence of thread galling is to adjust the thread geometry of the nozzle 18 and transfer seal 46.

The retaining member 48 of transfer seal 46 may alternatively be coupled to the nozzle 18 by one of brazing, welding, fusion or any other bonding process that may or may not require the use of a bonding material between retaining member 48 and the nozzle 18. There are no threads therefore thread galling cannot occur. In this arrangement, the retaining member 48 is removable from the nozzle 18 by raising the temperature at the brazed joint to a de-coupling temperature, which is above the operating temperature of the injection molding apparatus 10. In another embodiment of the present invention, not shown in the figures, nozzle tip 24, 24b and 24c depicted in FIG. 2, FIG. 3, FIG. 4 and FIG. 5 is attached to the nozzle by one of brazing, welding, fusion or any other bonding process that may or may not require the use of a bonding material between the nozzle tip and the nozzle 18. Reference is made in this regard to U.S. Pat. No. 6,009,616, U.S. Pat. No. 6,302,680, and U.S. Pat. No. 6,318,990 each of which is incorporated by reference in its entirety herein.

A shoulder 62 is provided on the end of the transfer seal 46 upstream of the threads 50. The shoulder 62 abuts a step 86 that is provided in the outer wall 66 of the nozzle tip 24 to secure the nozzle tip 24 to the nozzle 18. A retaining flange 82 extends inwardly from a downstream end of the retaining member 48.

Figure 3:
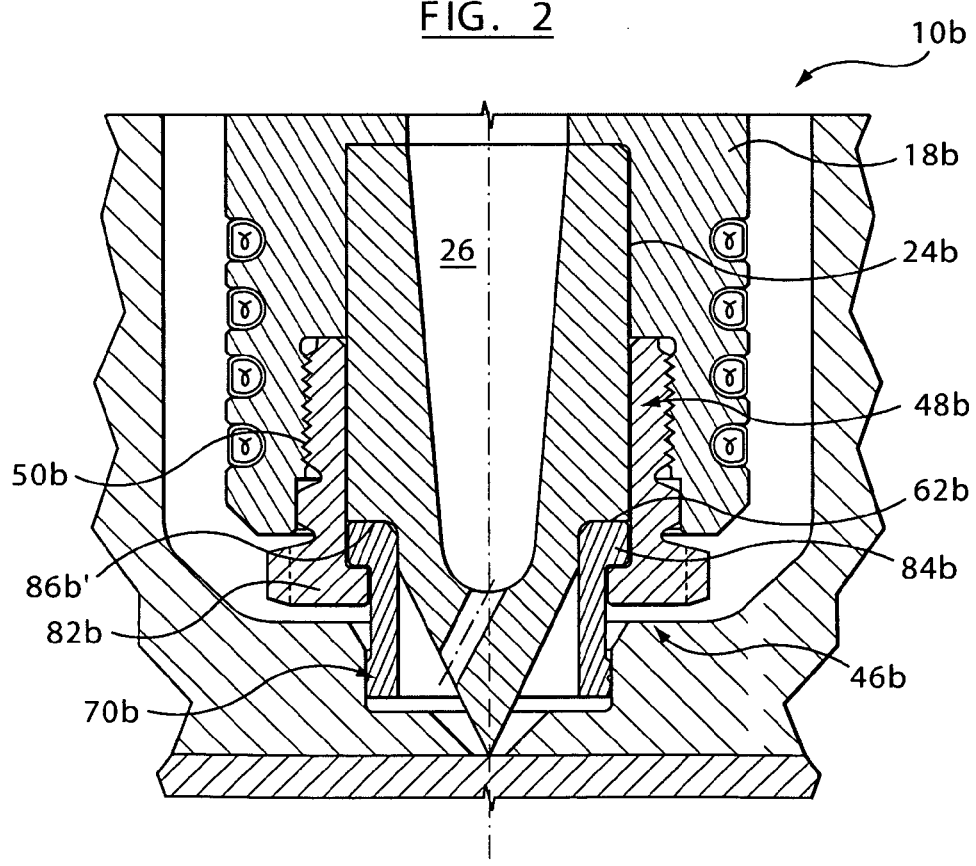
FIG. 3 is a side sectional view of a portion of an injection molding apparatus according to another embodiment of the present invention.

The sealing member 70, which is located downstream of the retaining member 48, includes a mating flange 84 for interlocking with the retaining flange 82 of the retaining member 48. The mating flange 84 is sandwiched between the retaining flange 82 of the retaining member 48 and the outer wall 66 of the nozzle tip 24 to hold the sealing member 70 in position. A second shoulder 62', which is provided on an upstream end of the mating flange 84, abuts a second step 86' of the nozzle tip 24. The second shoulder 62' is held in abutment with the nozzle tip 24 by the retaining flange 82 of the retaining member 48. The transfer seal 46 is sized so that both shoulders 62 and 62' are in abutment with the nozzle tip 24, however, it will be appreciated that only one shoulder is necessary to hold the nozzle tip 24 in position, as is shown in the embodiment of FIG. 3. Further, it will be appreciated by a person skilled in the art that the shoulders 62, 62' may be horizontal or alternatively may be sloped at any angle to accommodate various nozzle tip designs.

The sealing member 70 includes a sealing face 72 that abuts a surrounding wall 76 of an opening 74 in the mold cavity plate 32. At least the sealing face 72 of the sealing member 70 is comprised of a material having good thermal insulating properties, such as titanium, ceramic, thermally coated steel or a polyimide material, such as Vespel®, which is manufactured by Dupont, for example. The sealing face 72 insulates the nozzle tip 24 so that heat transfer from the cold mold plate 32 is reduced.

The outer wall 60 of the retaining member 48 of the transfer seal 46 includes a hexagonal nut-shaped portion 61 for mating with a tool to allow for tightening or loosening of the transfer seal 46.

In operation, the melt stream flows under pressure though the manifold channel 14 of the manifold 12 and into the nozzle channels 22 of a plurality of nozzles 18 of the injection molding apparatus 10. The melt flows from the nozzle channels 22 into the melt channels 26 of the respective nozzle tips 24, past the mold gates 30 and into the mold cavities 34. The mold cavities 34 are then cooled by the coolant flowing through the cooling ducts 44. Once a predetermined amount of time has elapsed, the molded parts are ejected from the mold cavities 34.

The retaining member 48 of the transfer seal 46 maintains the nozzle tip 24 in abutment with the nozzle 18 and the sealing member 70 provides a seal between the surrounding wall 76 of the mold cavity plate opening 74 and a sealing face 72 thereof to prevent melt from escaping into the insulative air space that surrounds the nozzle 18. Further, the sealing member 70 insulates the hot nozzle tip 24 from the cold mold cavity plate 32.

The two-piece transfer seal 46 provides an advantage in that the retaining member and sealing member may be made from different materials. Further, if one of the parts is damaged it is not necessary to replace the entire transfer seal 46, only the damaged portion.

Referring to FIG. 3, another embodiment of an injection molding apparatus 10b is shown. Like reference numerals have been used to denote like parts and only differences relative to the injection molding apparatus of FIGS. 1 and 2 will be discussed in detail.

In this embodiment, step 86 in nozzle tip 24b has been eliminated. As such, nozzle tip 24b is held in position by mating flange 84b of sealing member 70b. The shoulder 62b' of mating flange 84b of sealing member 70b is held in abutment with step 86b' of nozzle tip 24b by retaining flange 82b of the retaining member 48b, which in turn is coupled to nozzle 18b by threads 50b. The retaining member 48 may be comprised of a material such as Beryllium-Copper, Copper Alloy, Beryllium-free Copper, TZM, Tungsten Carbide, Tool Steel, Hardened Steel, H13, AerMet™ 100 or 310 Alloys, Ampco™, Stainless Steel or any other suitable thermally conductive material.

Figure 4:
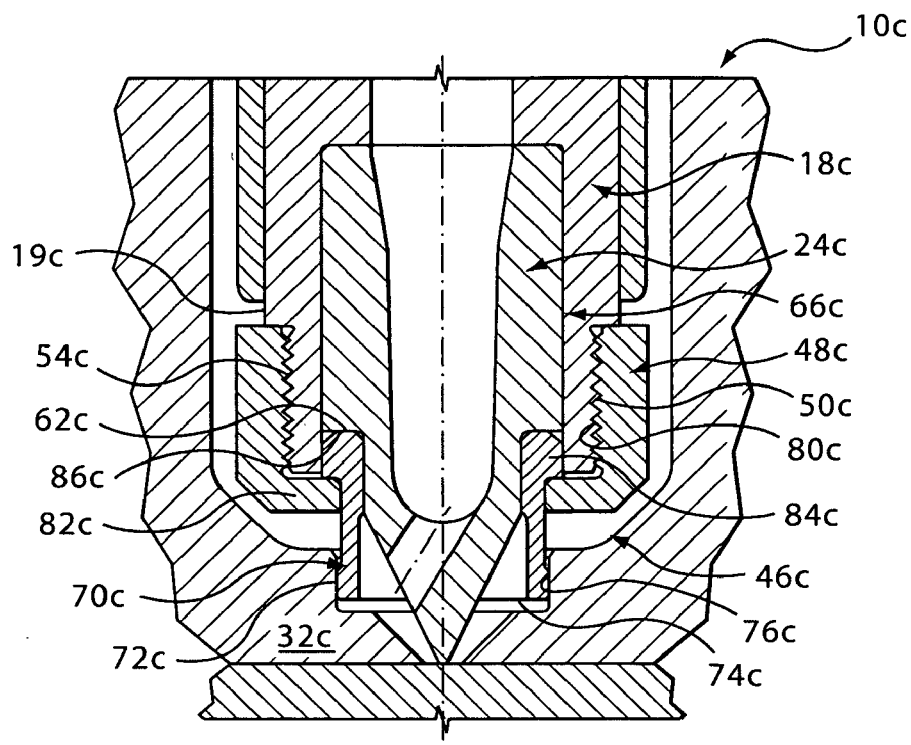
FIG. 4 is a side sectional view of a portion of an injection molding apparatus according to another embodiment of the present invention.

Referring to FIG. 4, another embodiment of an injection molding apparatus 10c is shown. Like reference numerals have been used to denote like parts and only differences relative to the injection molding apparatus of FIGS. 1 and 2 will be discussed in detail.

Similar to the transfer seal 46 and 46b of the previous embodiments, transfer seal 46c is comprised of a retaining member 48c and a separate sealing member 70c. The retaining member 48c includes an inner surface 80c having threads 50c formed therein. The threads 50c mesh with threads 54c that are formed on the outer surface 19c of the nozzle 18c. A retaining flange 82c extends inwardly from a downstream end of the retaining member 48c. The retaining member 48c may be comprised of any of the thermally conductive materials identified in relation to the retaining members of the previous embodiments. In this embodiment, the retaining member 48c is not located between the heater and the nozzle tip and therefore can be made out of a wider variety of materials with a wider range of thermal conductivity. Thus, retaining member 48c can be made of Vespel®, Titanium, H13 or Tool Steel.

The sealing member 70c that is located downstream of the retaining member 48c, includes a mating flange 84c. A shoulder 62c of the mating flange 84c, which is provided at an upstream end of the sealing member 70c, abuts a step 86c that is provided in an outer wall 66c of the nozzle tip 24c. The retaining flange 82c of the retaining member 48c secures the mating flange 84c in abutment with the nozzle tip 24c to couple the nozzle tip 24c to the nozzle 18c while holding the sealing member 70c in position.

The sealing member 70c further includes a sealing face 72c that abuts a surrounding wall 76c of an opening 74c in the mold cavity plate 32c. At least the sealing face 72c is comprised of a material having good thermal insulating properties, such as titanium, ceramic, thermally coated steels or a polyimide material, such as Vespel®, which is manufactured by Dupont, for example.

The transfer seal 46c performs similar securing, insulating and sealing functions as have been described with respect to the previous embodiments.

Figure 5:
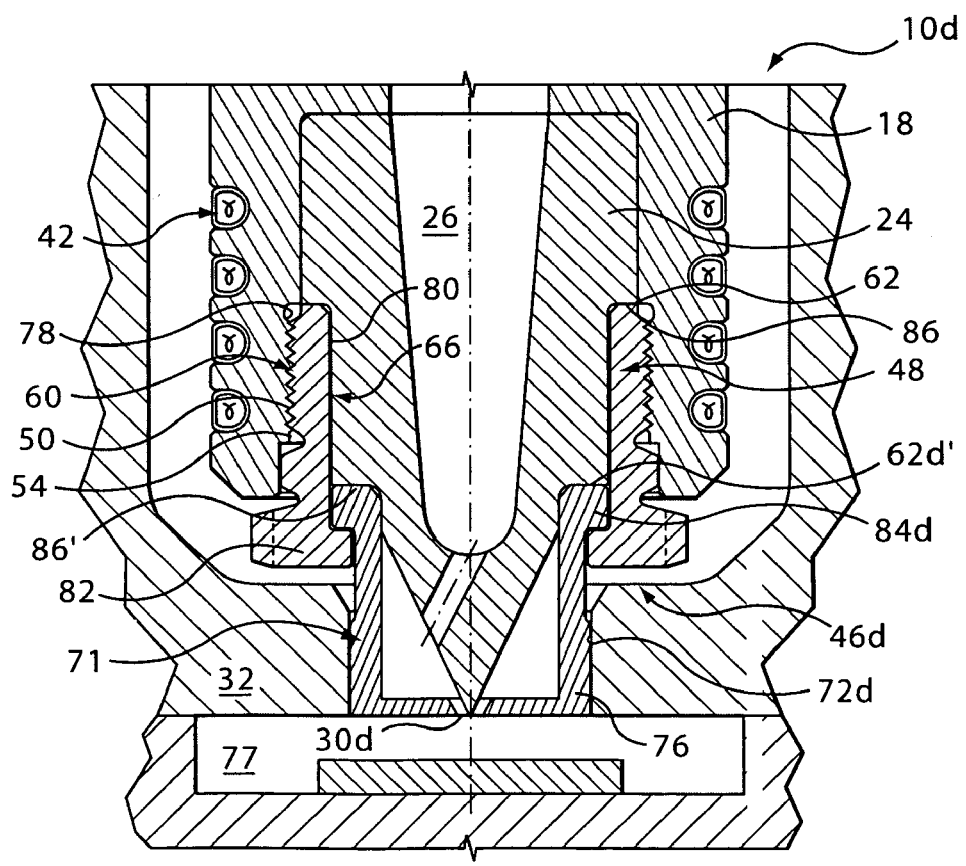
FIG. 5 is a side sectional view of a portion of an injection molding apparatus according to another embodiment of the present invention.

Referring to FIG. 5, another embodiment of an injection molding apparatus 10d is shown. Like reference numerals have been used to denote like parts and only differences relative to the injection molding apparatus of FIGS. 1 and 2 will be discussed in detail.

In this embodiment, transfer seal 46d is comprised of a retaining member 48 and a separate mold gate insert 71. The retaining member 48 is identical to that shown in FIG. 2, but the retaining member configurations shown in FIGS. 3 and 4 are equally applicable to this embodiment. The retaining member 48 may be comprised of any of the thermally conductive materials identified in relation to the retaining members of the previous embodiments.

The mold gate insert 71, which is located downstream of the retaining member 48, includes a mating flange 84d. A shoulder 62d' of the mating flange 84d, which is provided at an upstream end of the mold gate insert 71, abuts a step 86' that is provided in an outer wall 66 of the nozzle tip 24. The retaining flange 82 of the retaining member 48 secures the mating flange 84d in abutment with the nozzle tip 24 to couple the nozzle tip 24 to the nozzle 18 while holding the mold gate insert 71 in position.

The mold gate insert 71 includes a mold gate orifice 30d and abuts a surrounding wall 76 of mold cavity plate 32. In this embodiment, nozzle tip 24 is made from a highly thermally conductive material, such as, Beryllium-Copper, Beryllium-free Copper, TZM, or Ampco™. The mold gate insert 71 is comprised of a material having lower thermal conductivity and better wear resistance than the nozzle tip, such as, tool steel or hardened steel. The retaining member 48 is comprised of a material having good thermal conductivity from the same family of materials as the nozzle tip 24 so that this member does not retain any heat from heater 42 of the nozzle. If mold gate insert 71 is retained by a retaining member similar to 48c from FIG. 4, which is threaded onto the outer surface of the nozzle body 18, then retaining member 48 of FIG. 5 can be made of a material with thermal insulating properties, such as, titanium, ceramic, thermally coated steels or a polyimide material, such as Vespel®.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A transfer seal for coupling a nozzle tip to a nozzle of an injection molding apparatus, said transfer seal comprising:
    a retaining member removably connected to a downstream end of the nozzle, said retaining member having an inwardly directed retaining flange provided at a downstream end of said retaining member;
    a sealing member having a mating flange sandwiched between said inwardly directed retaining flange and a step provided in the nozzle tip, said sealing member having a sealing face capable of abutting a surrounding wall of a mold cavity plate opening when held by said retaining member; and
    wherein said retaining member is comprised of a first material and at least said sealing face of said sealing member is comprised of a second material.

2. A transfer seal as claimed in claim 1, wherein said first material and said second material are different.

3. A transfer seal as claimed in claim 2, wherein said first material is more thermally conductive than said second material.

4. A transfer seal as claimed in claim 1, wherein said first material is selected from the group consisting of: Beryllium-Copper, Copper Alloy, Beryllium-free Copper, TZM, Tungsten Carbide, Tool Steel, Hardened Steel, H13, an iron-cobalt-nickel alloy that has been strengthened by carbon, chrome, and molybdenum, alloys based on copper, bronze, aluminum, tin, brass, and also containing beryllium, and Stainless Steel.

5. A transfer seal as claimed in claim 4, wherein said second material is a thermal insulator.

6. A transfer seal as claimed in claim 5, wherein said second material is titanium.

7. A transfer seal as claimed in claim 5, wherein said second material is ceramic.

8. A transfer seal as claimed in claim 1, wherein an outer wall of said retaining member is threaded to mate with a threaded inner surface of the nozzle.

9. A transfer seal as claimed in claim 1, wherein an inner wall of said retaining member is threaded to mate with a threaded outer surface of the nozzle.

10. A transfer seal for coupling a nozzle tip to a nozzle of an injection molding apparatus, said transfer seal comprising:
    a retaining member removably connected to a downstream end of the nozzle, said retaining member having a shoulder for abutting a first step provided in the nozzle tip and an inwardly directed retaining flange provided at a downstream end of said retaining member;
    a sealing member having a mating flange sandwiched between said inwardly directed retaining flange and a second step provided in the nozzle tip, said sealing member having a sealing face capable of abutting a surrounding wall of a mold cavity plate opening when held by said retaining member; and
    wherein said retaining member is comprised of a first material and at least said sealing face of said sealing member is comprised of a second material.

11. A transfer seal as claimed in claim 10, wherein said first material and said second material are different.

12. A transfer seal as claimed in claim 11, wherein said first material is more thermally conductive than said second material.

13. A transfer seal as claimed in claim 10, wherein said first material is selected from the group consisting of: Beryllium-Copper, Copper Alloy, Beryllium-free Copper, TZM, Tungsten Carbide, Tool Steel, Hardened Steel, H13, an iron-cobalt-nickel alloy that has been strengthened by carbon, chrome, and molybdenum, alloys based on copper, bronze, aluminum, tin, brass, and also containing beryllium, and Stainless Steel.

14. A transfer seal as claimed in claim 13, wherein said second material is a thermal insulator.

15. A transfer seal as claimed in claim 14, wherein said second material is titanium.

16. A transfer seal as claimed in claim 14, wherein said second material is ceramic.

17. A transfer seal as claimed in claim 14, wherein an outer wall of said retaining member is threaded to mate with a threaded inner surface of the nozzle.

18. A transfer seal as claimed in claim 14, wherein an inner wall of said retaining member is threaded to mate with a threaded outer surface of the nozzle.

19. An injection molding apparatus comprising:
    a manifold having a manifold channel for delivering a melt stream of moldable material to a nozzle channel of a nozzle, said nozzle being received in a mold cavity plate opening;
    a nozzle tip nested in a downstream end of said nozzle, said nozzle tip having a melt channel in communication with said nozzle channel for receiving said melt stream from said nozzle channel;
    a mold cavity for receiving said melt stream from said melt channel of said nozzle tip through a mold gate;
    a transfer seal having a retaining member and a sealing member for coupling said nozzle tip to said nozzle, said retaining member being removably connected to said downstream end of said nozzle and having an inwardly directed retaining flange, said sealing member having an outwardly directed mating flange that is sandwiched between said inwardly directed retaining flange and a step provided in said nozzle tip, a sealing surface of said sealing member abutting a surrounding wall of said mold cavity plate opening; and wherein said retaining member is comprised of a first material and at least said sealing face of said sealing member is comprised of a second material.

20. An injection molding apparatus as claimed in claim 19, wherein said first material and said second material are different and said first material is more thermally conductive than said second material.

21. An injection molding apparatus as claimed in claim 19, wherein said first material is selected from the group consisting of: Beryllium-Copper, Copper Alloy, Beryllium-free Copper, TZM, Tungsten Carbide, Tool Steel, Hardened Steel, H13, an iron-cobalt-nickel alloy that has been strengthened by carbon, chrome, and molybdenum, alloys based on copper, bronze, aluminum, tin, brass, and also containing beryllium, and Stainless Steel.

22. An injection molding apparatus as claimed in claim 21, wherein said second material is a thermal insulator selected from the group consisting of: titanium and ceramic.

23. An injection molding apparatus as claimed in claim 19, wherein said step is inclined at an angle of less than 90 degrees relative to an axis of said nozzle channel.

24. An injection molding apparatus as claimed in claim 19, wherein said outwardly directed mating flange of said sealing member and said inwardly directed retaining flange of said retaining member are generally parallel and extend generally perpendicular to an axis of said nozzle channel.

25. An injection molding apparatus comprising:
a manifold having a manifold channel for delivering a melt stream of moldable material to a nozzle channel of a nozzle, said nozzle having a threaded downstream end;
a nozzle tip located adjacent said threaded downstream end of said nozzle, said nozzle tip having a melt channel in communication with said nozzle channel for receiving the melt stream from said nozzle channel;
a mold cavity for receiving the melt stream from said melt channel of said nozzle tip through a mold gate;
a transfer seal for securing said nozzle tip to said nozzle, said transfer seal having a retaining member for mating with said threaded downstream end of said nozzle, a shoulder for abutting at least a portion of an outer wall of said nozzle tip and a sealing member having a sealing face capable of abutting a cavity plate surrounding the mold gate when held by said retaining member;
wherein an outwardly directed flange of said sealing member is sandwiched between an inwardly directed flange of said retaining member and a step provided in an outer wall of said nozzle tip.

26. An injection molding apparatus as claimed in claim 25, wherein said retaining member is comprised of a first material and at least said sealing face of said sealing member is comprised of a second material.

27. An injection molding apparatus as claimed in claim 26, wherein said first material and said second material are different and said first material is more thermally conductive than said second material.

28. An injection molding apparatus as claimed in claim 26, wherein said first material is selected from the group consisting of: Beryllium-Copper, Copper Alloy, Beryllium-free Copper, TZM, Tungsten Carbide, Tool Steel, Hardened Steel, H13, an iron-cobalt-nickel alloy that has been strengthened by carbon, chrome, and molybdenum, alloys based on copper, bronze, aluminum, tin, brass, and also containing beryllium, and Stainless Steel.

29. An injection molding apparatus as claimed in claim 28, wherein said second material is a thermal insulator selected from the group consisting of: titanium and ceramic.

30. An injection molding apparatus as claimed in claim 25, wherein said outwardly directed mating flange of said sealing member and said inwardly directed retaining flange of said retaining member are generally parallel and extend generally perpendicular to an axis of said nozzle channel.

* * * * *